(12) United States Patent
Perumalla et al.

(10) Patent No.: US 11,856,622 B2
(45) Date of Patent: Dec. 26, 2023

(54) DYNAMIC PAIRING OF DEVICES BASED ON WORKFLOW HISTORY FOR WIRELESS COMMUNICATION

(71) Applicant: International Business Machines Corporation, Armonk, NY (US)

(72) Inventors: Saraswathi Sailaja Perumalla, Visakhapatnam (IN); Venkata Vara Prasad Karri, Visakhapatnam (IN); Sarbajit K. Rakshit, Kolkata (IN); Dilip Kumar Ronanki, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 17/444,380

(22) Filed: Aug. 3, 2021

(65) Prior Publication Data

US 2023/0038849 A1    Feb. 9, 2023

(51) Int. Cl.
*H04W 76/14* (2018.01)
*H04W 4/029* (2018.01)

(52) U.S. Cl.
CPC .......... *H04W 76/14* (2018.02); *H04W 4/029* (2018.02)

(58) Field of Classification Search
None
See application file for complete search history.

(56) References Cited

U.S. PATENT DOCUMENTS

| | | | |
|---|---|---|---|
| 8,638,222 B2 | 1/2014 | Soldan | |
| 8,798,252 B2 | 8/2014 | Krantz | |
| 8,811,900 B2 | 8/2014 | Kirsch | |
| 9,480,095 B2 | 10/2016 | Hrabak | |
| 9,648,490 B2 | 5/2017 | Linsky | |
| 10,200,849 B1 | 2/2019 | Heide | |
| 10,223,908 B2 | 3/2019 | Sallas | |
| 2012/0322376 A1 | 12/2012 | Couse | |
| 2013/0080676 A1 | 3/2013 | Mifsud | |
| 2018/0014145 A1 | 1/2018 | Seaman | |
| 2018/0277255 A1 | 9/2018 | Martin | |
| 2021/0251026 A1* | 8/2021 | Mitsuhashi | H04W 76/38 |
| 2022/0274503 A1* | 9/2022 | Shin | B60L 53/18 |
| 2022/0312507 A1* | 9/2022 | Wang | H04W 76/10 |

OTHER PUBLICATIONS

"Build location-aware apps", Android Developers, last printed Jul. 30, 2021, 3 pages, <https://developer.android.com/ training/ location>.

(Continued)

*Primary Examiner* — German Viana Di Prisco

(74) *Attorney, Agent, or Firm* — Michael A. Petrocelli

(57) ABSTRACT

Devices are dynamically paired at a new location based on historical context with respect to previous device pairing and a pairing environment. A request is received at a computer to pair a user device to a device at a new location. Historical context of the user device paired at a previous location to one or more devices at the previous location is analyzed. Pairing of the user device to the device at the new location is automatically initiated based on the analysis of the historical context, and the automatic initiation includes adjusting settings on the user device based on the historical context. Pairing the user device to the device at the new location automatically.

20 Claims, 9 Drawing Sheets

(56) References Cited

OTHER PUBLICATIONS

"How to connect to nearby devices using Samsung Connect in Samsung Galaxy S8 plus?" Samsung, Last Update date : Oct. 30. 2020, 4 pages, <https://www.samsung.com/in/support/mobile-devices/how-do-i-connect-to-nearby-devices-using-samsung-connect-in-samsung-galaxy-s8-plus/>.

Mell, et al., "The NIST Definition of Cloud Computing", National Institute of Standards and Technology, Special Publication 800-145, Sep. 2011, 7 pages.

Peng, et al., "Point&Connect: Intention-based Device Pairing for Mobile Phone Users", Proceedings of the 7th international conference on Mobile Systems, Applications, and Services, Jun. 22, 2009, 14 pages, <https://www.cs.purdue.edu/homes/chunyi/pubs/mobisys09-pc.pdf>.

* cited by examiner

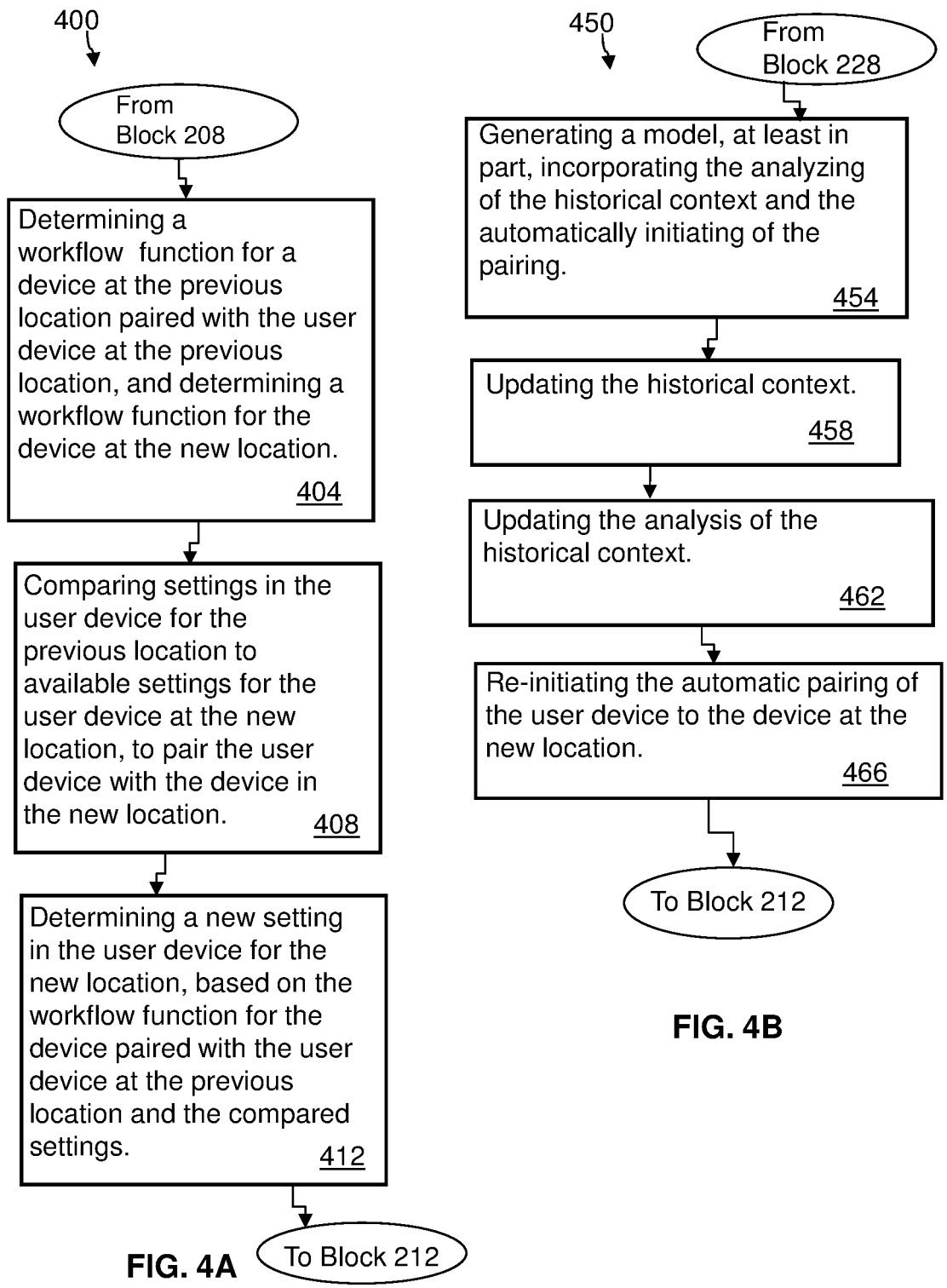

DYNAMIC PAIRING OF DEVICES BASED ON WORKFLOW HISTORY FOR WIRELESS COMMUNICATION

BACKGROUND

The present disclosure relates to dynamic pairing of devices, including mobile devices, at a location using electronic communication connection protocols between devices, such as short-range wireless technology.

Typically, devices can connect and communicate with each other at a location using connection protocols between devices, such as short-range wireless technology standards for exchanging data between devices. The devices can be mobile devices as well as stationary or static devices.

In one example, devices can participate in collaborating activities by being paired, such that required information for the activities can be shared with each of the devices to perform the activities. For different types of activities, different devices can be paired with each other. For example, in a multi-device ecosystem, there can be mobile devices, wearable devices, various display devices, CCTV (Closed Circuit Television) cameras, door lock computing system, etc. Further, examples can include a device which can be fixed sets of devices, television, or building access or facility devices, and some of the devices can be mobile, for instance wearable, mobile phones, display devices, laptop computers, etc.

However, a user having a mobile device can move to a new or different location. The mobile device may not be set up for pairing with one or more new devices in the new location. This can require the use to manually pair devices, and troubleshoot any issues with pairing devices, which can also be time consuming.

In another example, multiple people or a group of people can work together, sharing work surrounding, for example, a team can move from one location to another location. However, in a new location, the users' mobile devices may not pair with devices at the new workplace, resulting in similar problems of manually pairing and troubleshooting issues with pairing devices.

In another example, a workplace can be changed, or can be changed because of change in contextual situation, in this case, if a group of team members are changing their working location from one place to another place, the group of team members can have to manually configure their devices in the new location, like paring with a static computing device in the new location etc. For example, a group of team member who decide to perform the same activities from a meeting room, or from any offsite location, may have to time to configure devices. In one instance, not all wireless devices use the same wireless technology for communications. Different technologies may not work together, and thus certain devise may not be able to connect at a different location or environment.

SUMMARY

The present disclosure recognizes the shortcomings and problems associated with current techniques for dynamic pairing of devices at a new location.

The present Invention includes a method and system for dynamic pairing of devices at a new location. In one example, a user can change from one location to another, or change to a temporary work location. A user device can auto-pair with one or more devices at the new location, which can include appropriate static devices in the new working location. The pairing can be based on the context of user activities in the previous work location, so that the user can continue to perform the activities without any need of manual configuration of the devices in the new location.

In one example according to the invention, devices can participate in collaborating activities by being automatically paired, such that required information for the activities can be shared with each of the devices to perform the activities. For different types of activities, different devices can be paired with each other. For example, in a multi-device ecosystem, there can be mobile devices, wearable devices, various display devices, cameras, door lock computing system, etc., thus, based on the shared information, the devices can communicate with each other to perform various collaborative computing. In another example where multiple groups of people are working together, or in a team environment of shared working environment, the team can move from one location to another location, and in the new location the team can be automatically paired with devices at the new location.

Embodiments of the present invention provide a method and system where when a group of people are change their temporary working location, the devices of the people will auto-pair with appropriate static devices in the new work location based on the context of their activities in the previous work location. Thereby, the people/users can continue to perform device/communications activities using their devices without any need of configuration of the devices in the new location.

In an aspect according to the present invention, a computer-implemented method includes dynamic pairing of devices at a new location based on historical context with respect to previous device pairing and a pairing environment. The method includes receiving, at a computer, a request to pair a user device to a device at a new location. The method further includes analyzing, using the computer, historical context of the user device paired at a previous location to one or more devices at the previous location. Further, the method includes automatically initiating pairing of the user device to the device at the new location based on the analysis of the historical context, and the automatic initiation includes adjusting settings on the user device based on the historical context. The method includes automatically pairing the user device to the device at the new location.

In a related aspect, the method includes comparing settings in the user device for the previous location to available settings in the device at the new location, to pair with the device in the new location.

In a related aspect, the method includes determining a workflow function for a device at the previous location paired with the user device at the previous location, and determining a workflow function for the device at the new location. The method includes comparing settings in the user device for the previous location to available settings for the user device at the new location, to pair the user device with the device in the new location. Further, the method includes determining a new setting in the user device for the new location, based on the workflow function for the device paired with the user device at the previous location and the compared settings.

In a related aspect, the method includes determining a workflow function for a device at the previous location paired with the user device at the previous location, and determining a workflow function for a device at the new location. The method includes identifying a type of activity for the device at the new location. Further, the method includes comparing settings in the user device for the previous location to available settings in the user device for pairing to the device at the new location, and comparing setting of the device at the previous location to the setting of the device at the new location for pairing the user device with the device in the new location. The method includes determining new settings in the user device for the new location, based on the comparing of the settings in the user device for the previous location and the available settings in the user device. And further comparing the available settings in the device in the new location, to pair the user device to the device in the new location. The determining of the new settings based on the workflow function and the type of activity for the device at both the previous location and the new location.

In a related aspect, the method further includes sending a notification to the user device communicating a failure to pair with the device at the new location.

In a related aspect, the method further includes sending a notification to the user device communicating a failure to pair with the device at the new location; and sending a recommendation to the user device for pairing with the device at the new location in response to the failure to pair.

In a related aspect, the method further includes generating a model, at least in part, incorporating the analyzing of the historical context and the automatically initiating of the pairing. The method includes updating the historical context, updating the analysis of the historical context; and re-initiating the automatic pairing of the user device to the device at the new location.

In a related aspect, the method further includes receiving, at the computer, a request to pair the user device to a plurality of device at the new location. The method further includes analyzing, using the computer, historical context of the user device paired at previous locations to one or more devices at each of the previous locations. Also, the method includes automatically initiating pairing of the user device to one or more of the plurality of devices at the new location based on the analysis of the historical context, wherein the automatic initiation includes adjusting settings on the user device based on the historical context. The method includes automatically pairing the user device to the one or more of the plurality of devices at the new location.

In a related aspect, the method includes the user device communicating with a cloud-based account using a communications network.

In a related aspect, the historical context is included in historical data stored in a knowledge corpus database.

In another aspect according to the present invention, a system using a computer for dynamic pairing of devices at a new location based on historical context with respect to previous device pairing and a pairing environment includes a computer system comprising: a computer processor, a computer-readable storage medium, and program instructions stored on the computer-readable storage medium being executable by the processor, to cause the computer system to perform the following functions to: receive, at a computer, a request to pair a user device to a device at a new location; analyze, using the computer, historical context of the user device paired at a previous location to one or more devices at the previous location; automatically initiate pairing of the user device to the device at the new location based on the analysis of the historical context, the automatic initiation including adjusting settings on the user device based on the historical context; and automatically pair the user device to the device at the new location.

In a related aspect, the system further includes comparing settings in the user device for the previous location to available settings in the device at the new location, to pair with the device in the new location.

In a related aspect, the system includes determining a workflow function for a device at the previous location paired with the user device at the previous location, and determining a workflow function for the device at the new location. The system further includes comparing settings in the user device for the previous location to available settings for the user device at the new location, to pair the user device with the device in the new location. The system includes determining a new setting in the user device for the new location, based on the workflow function for the device paired with the user device at the previous location and the compared settings.

In a related aspect, the system further includes determining a workflow function for a device at the previous location paired with the user device at the previous location, and determining a workflow function for a device at the new location, and identifying a type of activity for the device at the new location. The system includes comparing settings in the user device for the previous location to available settings in the user device for pairing to the device at the new location, and comparing setting of the device at the previous location to the setting of the device at the new location for pairing the user device with the device in the new location. The system includes determining new settings in the user device for the new location, based on the comparing of the settings in the user device for the previous location and the available settings in the user device, and the available settings in the device in the new location, to pair the user device to the device in the new location. The determining of the new settings being based on the workflow function and the type of activity for the device at both the previous location and the new location.

In a related aspect, the system includes sending a notification to the user device communicating a failure to pair with the device at the new location.

In a related aspect, the system includes sending a notification to the user device communicating a failure to pair with the device at the new location; and sending a recommendation to the user device for pairing with the device at the new location in response to the failure to pair.

In a related aspect, the system includes generating a model, at least in part, incorporating the analyzing of the historical context and the automatically initiating of the pairing. The system includes updating the historical context; updating the analysis of the historical context; and re-initiating the automatic pairing of the user device to the device at the new location.

In a related aspect, the system includes receiving, at the computer, a request to pair the user device to a plurality of device at the new location; analyzing, using the computer, historical context of the user device paired at previous locations to one or more devices at each of the previous locations; automatically initiating pairing of the user device to one or more of the plurality of devices at the new location based on the analysis of the historical context, where the automatic initiation includes adjusting settings on the user device based on the historical context. The method includes automatically pairing the user device to the one or more of the plurality of devices at the new location.

In a related aspect, the system includes the user device communicating with a cloud based account using a communications network.

In another aspect according to the present invention, a computer program product includes dynamic pairing of devices at a new location based on historical context with respect to previous device pairing and a pairing environment. The computer program product comprising a computer readable storage medium having program instructions embodied therewith, the program instructions executable by a computer to cause the computer to perform functions, by the computer, comprising the functions to: receive, at a computer, a request to pair a user device to a device at a new location; analyze, using the computer, historical context of the user device paired at a previous location to one or more devices at the previous location; automatically initiate pairing of the user device to the device at the new location based on the analysis of the historical context, the automatic initiation including adjusting settings on the user device based on the historical context; and automatically pair the user device to the device at the new location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 4A is a flow chart illustrating another method, which continues from the flow chart of FIG. 2, for dynamic pairing of devices at a new location based on historical context with respect to previous device pairing.

FIG. 4B is a flow chart illustrating another method, which continues from the flow chart of FIG. 2, for dynamic pairing of devices at a new location based on historical context with respect to previous device pairing, and which generates and uses a computer model.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Figure 1:
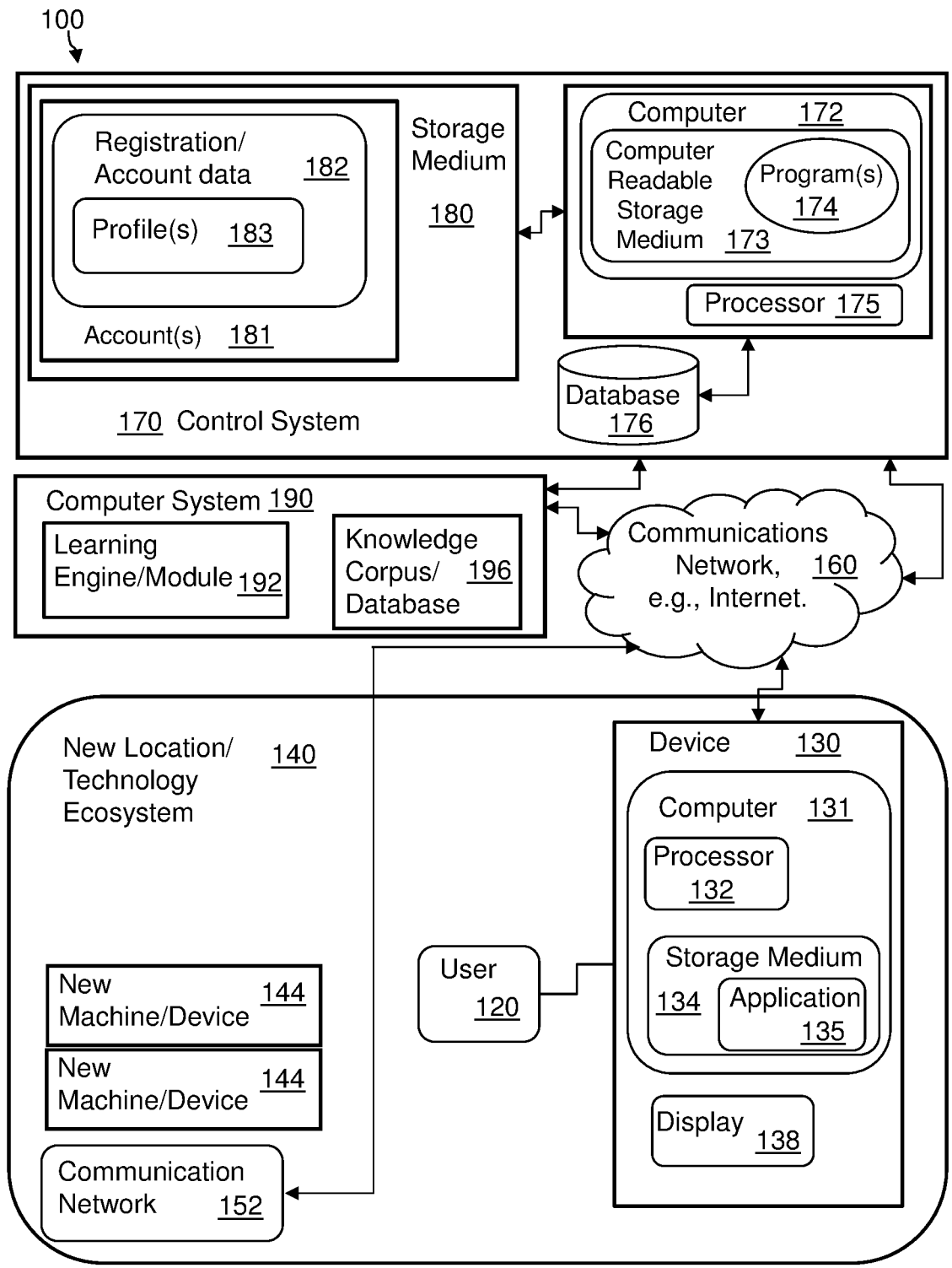
FIG. 1 is a schematic block diagram illustrating an overview of a system, system features or components, and methodology for dynamic pairing of devices at a new location based on historical context with respect to previous device pairing and a pairing environment, according to an embodiment of the present disclosure.
Figure 2:
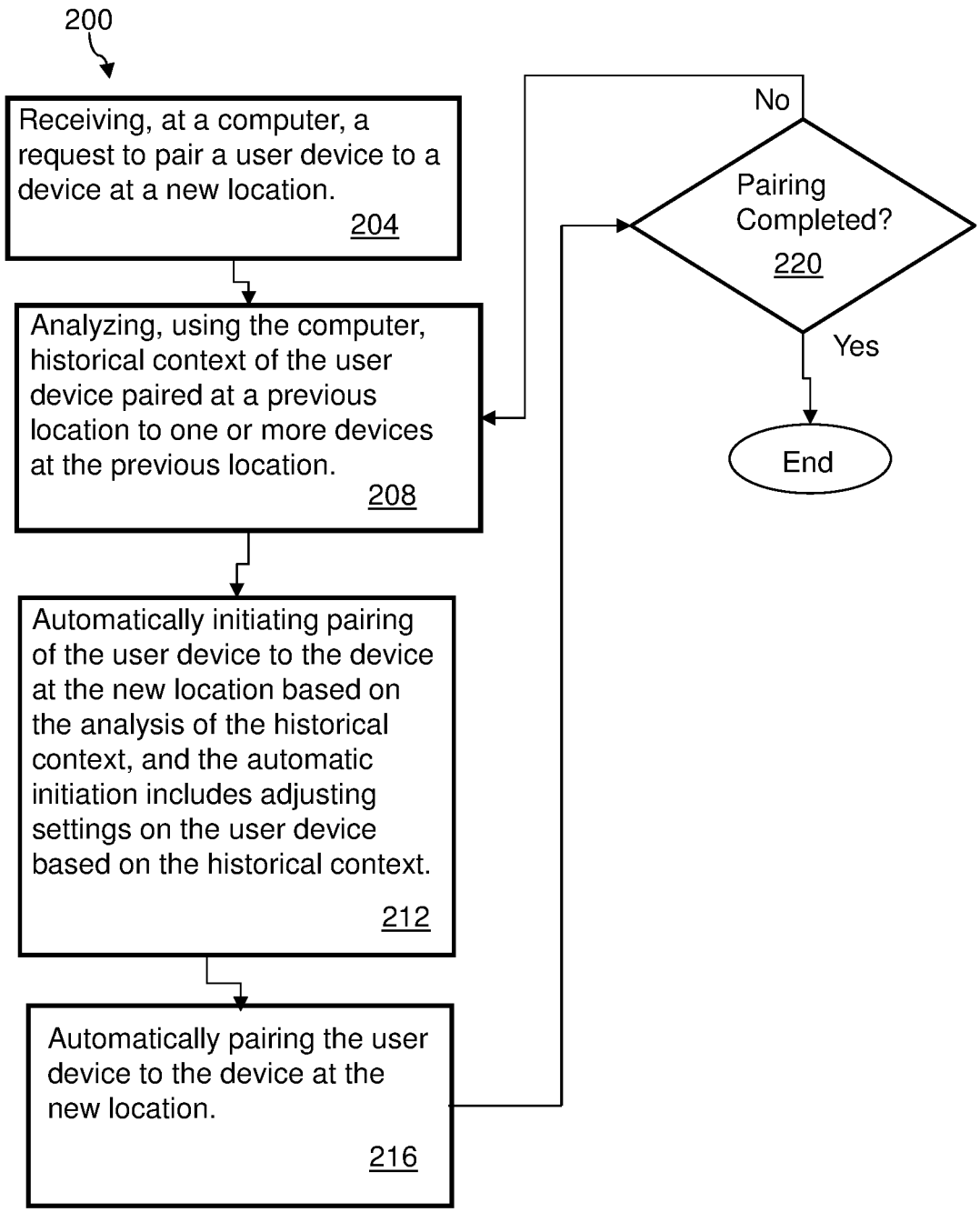
FIG. 2 is a flow chart illustrating a method, implemented using the system shown in FIG. 1, for dynamic pairing of devices at a new location based on historical context with respect to previous device pairing and a pairing environment, according to an embodiment of the present disclosure.
Figure 3:
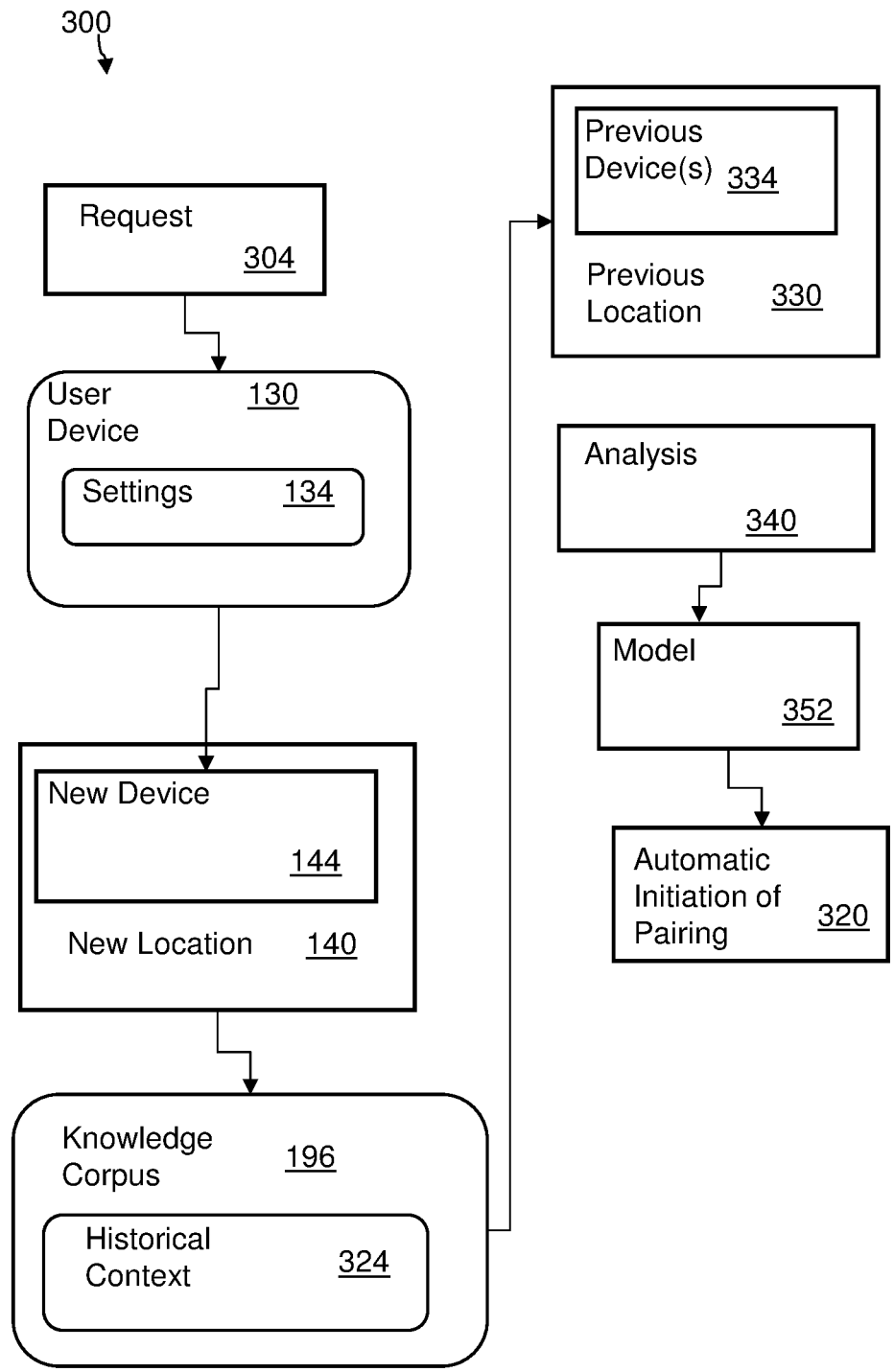
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for dynamic pairing of devices at a new location based on historical context with respect to previous device pairing and a pairing environment.

Referring to FIGS. 1, 2 and 3, a computer-implemented method 200 for dynamic pairing of devices at a new location based on historical context with respect to previous device pairing and a pairing environment, according to an embodiment of the present disclosure, includes operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes receiving, at a computer 131, a request 304 to pair a user device 130 of a user 120 to a device 144 at a new location 140, as in block 204. The computer 131 can communicate, all or in part with, a computer 172 which can be remote as part of a control system 170, or all or part of a remote server. The control system can include a computer 172 having a computer readable storage medium 173 which can store one or more programs 174, and a processor 175 for executing program instructions. The control system can also include a storage medium which can include registration and/or account data 182 and profiles 183 of users as part of user accounts 181. User accounts 181 can be stored on a storage medium 180 which is part of the control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can be remote from the user device 130, and in another example, the computer system 190 can be all or part of the control system, or all or part of the device 130. The depiction of the computer system 190 as well as the other components of the system 100 are shown as one example according to the present disclosure.

The new or different AI (Artificial Intelligence) ecosystem, or technology/communication or IT (Information Technology) ecosystem can include a local communications network 152 which can communicate with the communications network 160. The system 100 can include a learning engine/module 192, which can be at least part of the control system or communicating with the control system, for generating a model or learning model. In one example, the learning model can model workflow in a new AI or IT ecosystem for machine/devices in the new ecosystem.

In another example, the computer 131 can be part of a device 130. The computer can include a processor 132 and a computer readable storage medium 134 where an application 135 can be stored which can in one example, embody all or part of the method of the present disclosure. The application can include all or part of instructions to implement the method of the present disclosure, embodied in code and stored on a computer readable storage medium. The device can include a display 138. The device 130 can operate, in all or in part, in conjunction with a remote server by way of a communications network 160, for example, the Internet. The device 130 can be a mobile device such as a mobile phone, or tablet, or a laptop computer. The device or new device 144 objects can include static devices, such as printer, servers, routers, etc. The devices or new devices communicate with a communication network 152 in a new ecosystem at a new location 140. New machines and/or devices 144 are represented in FIG. 1, and it is understood that these represent one or more machines or devices at a new location and/or technology or IT (Information Technology) ecosystem.

Referring to FIGS. 1, 2, and 3, the method 200 can include analyzing 340, using the computer 131, historical context 324 of the user device 130 paired at a previous location 330 to one or more previous devices 334 at the previous location 330, as in block 208. The analysis 340 can include generating a model 352 of pairing scenarios for the user device with new devices at the new location.

The computer 131 can use a knowledge corpus database 196 to determine previous communication types, and protocols, as well as a historical record, as part of the historical context. The knowledge corpus 196 can be populated by historical data gathered from the user device and related to the device communications and pairing history. The pairing history to devices can include IoT devices, stationary devices, mobile devices, etc. The computer can use the knowledge corpus 196 to determine a workflow for the device and better predict and initiate pairing to new devices when the user device is in a new location. Further, the computer can use the knowledge corpus to determine compatibility of devices, for instance, protocol compatibility. In one example, the method can determine the user device specifications, for instance by auto detection or by a user input, and the method can detect specifications of new devices by detecting and analyzing the new devices' communication to join or communicate with other devise, for example, a Wi-Fi protocol or standard for the new device. Wi-Fi includes a family of wireless network protocols, based on the IEEE 802.11 family of standards, which are commonly used for local area networking of devices and Internet access. The method can analyze the user device specification and the new devices parameters including protocols and determine how the user device can communicate with the new device, such as settings in the user device.

The method 200 includes automatically initiating pairing of the user device to the device at the new location based on the analysis of the historical context, the automatic initiation including adjusting settings on the user device based on the historical context, as in block 212. For example, the pairing includes an electronic communication capability between the user device and the device or new device at the new location, which can including using a Wi-Fi communications standard.

The method 200 includes automatically pairing 320 the user device 130 to the device or new device 144 at the new location 140, as in block 216.

The method includes determining when the pairing has occurred, as in block 220. When the pairing has not been successfully completed, the method returns to block 208. When the pairing has been successfully completed, the method ends.

In one example, the method can include comparing settings in the user device for the previous location to available settings in the device at the new location, to pair with one or more devices in the new location.

Referring to FIG. 4A, in another embodiment according to the present disclosure, a method 400 can proceed from block 208 of the method 200 shown in FIG. 2, and includes determining a workflow function for a device at the previous location paired with the user device at the previous location, and determining a workflow function for the device at the new location, as in block 404. The method 400 includes comparing settings in the user device for the previous location to available settings for the user device at the new location, to pair the user device with the device in the new location, as in block 408. The method 400 includes determining a new setting in the user device for the new location, based on the workflow function for the device paired with the user device at the previous location and the compared settings, as in block 412. The method 400 proceeds to block 212 of the method 200 shown in FIG. 2.

In one example, the method 200 can include determining a workflow function for a device at the previous location paired with the user device at the previous location, and determining a workflow function for a device at the new location, and identifying a type of activity for the device at the new location. The method includes comparing settings in the user device for the previous location to available settings in the user device for pairing to the device at the new location, and comparing setting of the device at the previous location to the setting of the device at the new location for pairing the user device with the device in the new location. The method further includes determining new settings in the user device for the new location, based on the comparing of the settings in the user device for the previous location and the available settings in the user device, and the available settings in the device in the new location, to pair the user device to the device in the new location. And, the method includes determining the new settings based on the workflow function and the type of activity for the device at both the previous location and the new location.

In one example, the method further includes sending a notification to the user device communicating a failure to pair with the device at the new location.

In another example, the method further includes sending a notification to the user device communicating a failure to pair with the device at the new location, and sending a recommendation to the user device for pairing with the device at the new location in response to the failure to pair.

Referring to FIG. 4B, in another embodiment according to the present disclosure, a method 450 can proceed from block 208 of the method 200 shown in FIG. 2, and includes generating a model, at least in part, incorporating the analyzing of the historical context and the automatically initiating of the pairing, as in block 454. The method 450 includes updating the historical context, as in block 458. The method further includes updating the analysis of the historical context, as in block 462. The method includes re-initiating the automatic pairing of the user device to the device at the new location, as in block 466. The method 400 proceeds to block 212 of the method 200 shown in FIG. 2.

The method 200 can include receiving, at the computer, a request to pair the user device to a plurality of device at the new location. The method includes analyzing, using the computer, historical context of the user device paired at previous locations to one or more devices at each of the previous locations. Further, the method includes automatically initiating pairing of the user device to one or more of the plurality of devices at the new location based on the analysis of the historical context. The automatic initiation including adjusting settings on the user device based on the historical context. The method further includes automatically pairing the user device to the one or more of the plurality of devices at the new location.

The method includes the user device communicating with a cloud based account using a communications network. The historical context can include historical data stored in a knowledge corpus database.

A user can use an augmented reality device 137 having a display 138. In one example, the augmented reality (AR) device can be an AR headset. In another example, the augmented reality device can be AR glasses. Using the AR device can include a visual cue to a user, a selection of one or more options by the user, or a physical action such as a hand gesture or a finger pointing, wherein such physical actions can work in concert with the AR device to implement an action initiated by the user. The AR device can communicate with the user's device 130, and/or alternatively, communicate with a communications network 160.

Other Embodiments and Examples

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 150 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for users/participants. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

More Embodiments and Examples

Figure 5A:
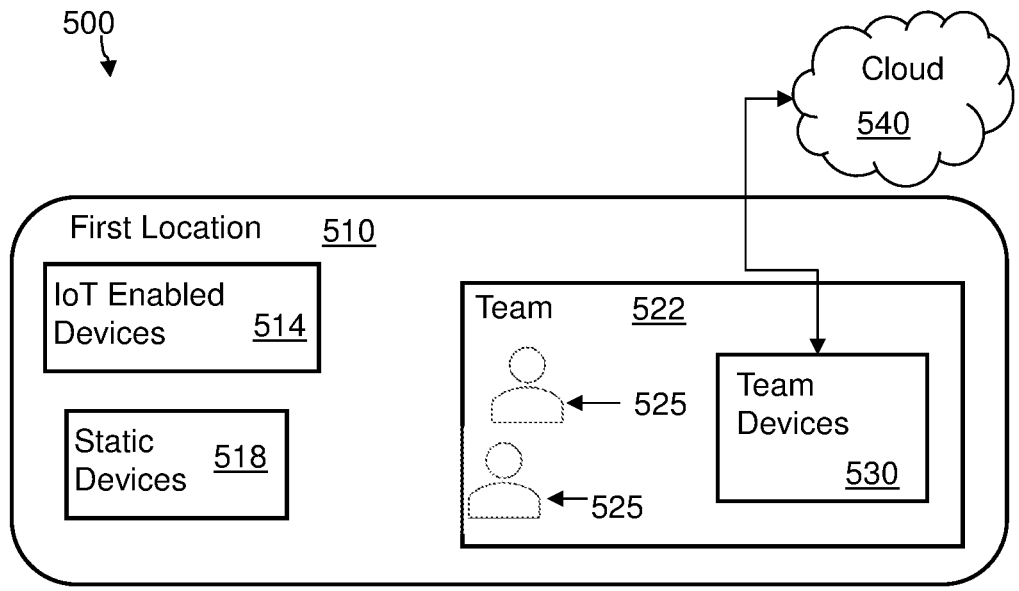
FIG. 5A is a block diagram illustrating another system according to an embodiment of the present invention, for dynamic pairing of devices at a new location based on historical context with respect to previous device pairing.
Figure 5B:
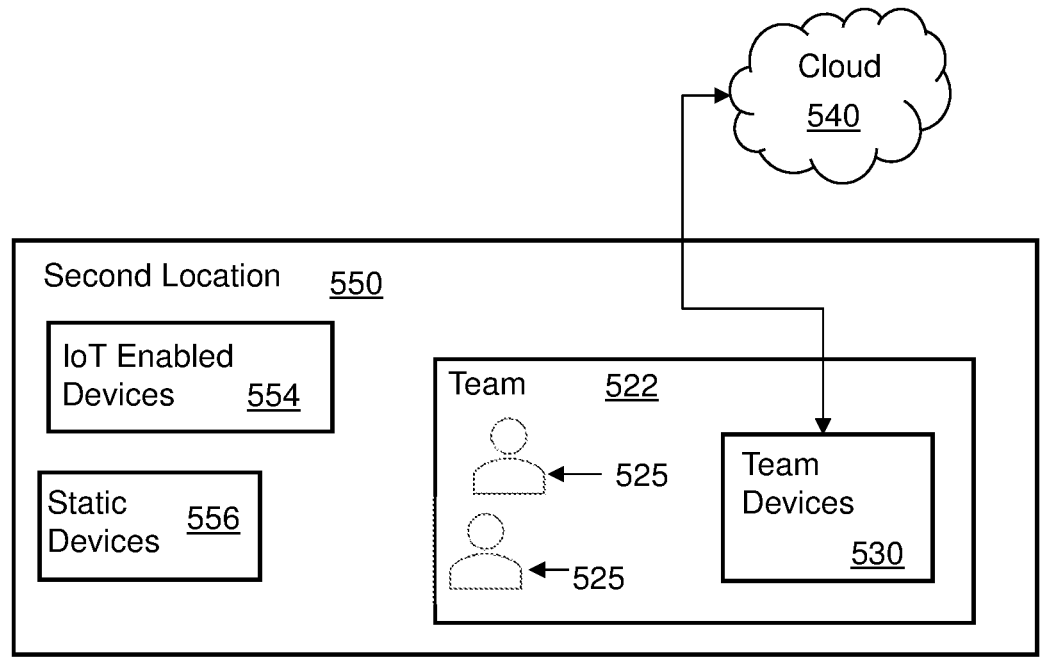
FIG. 5B is a block diagram illustrating another system according to an embodiment of the present invention, for dynamic pairing of devices at a second location based on historical context with respect to previous device pairing.
Figure 6:
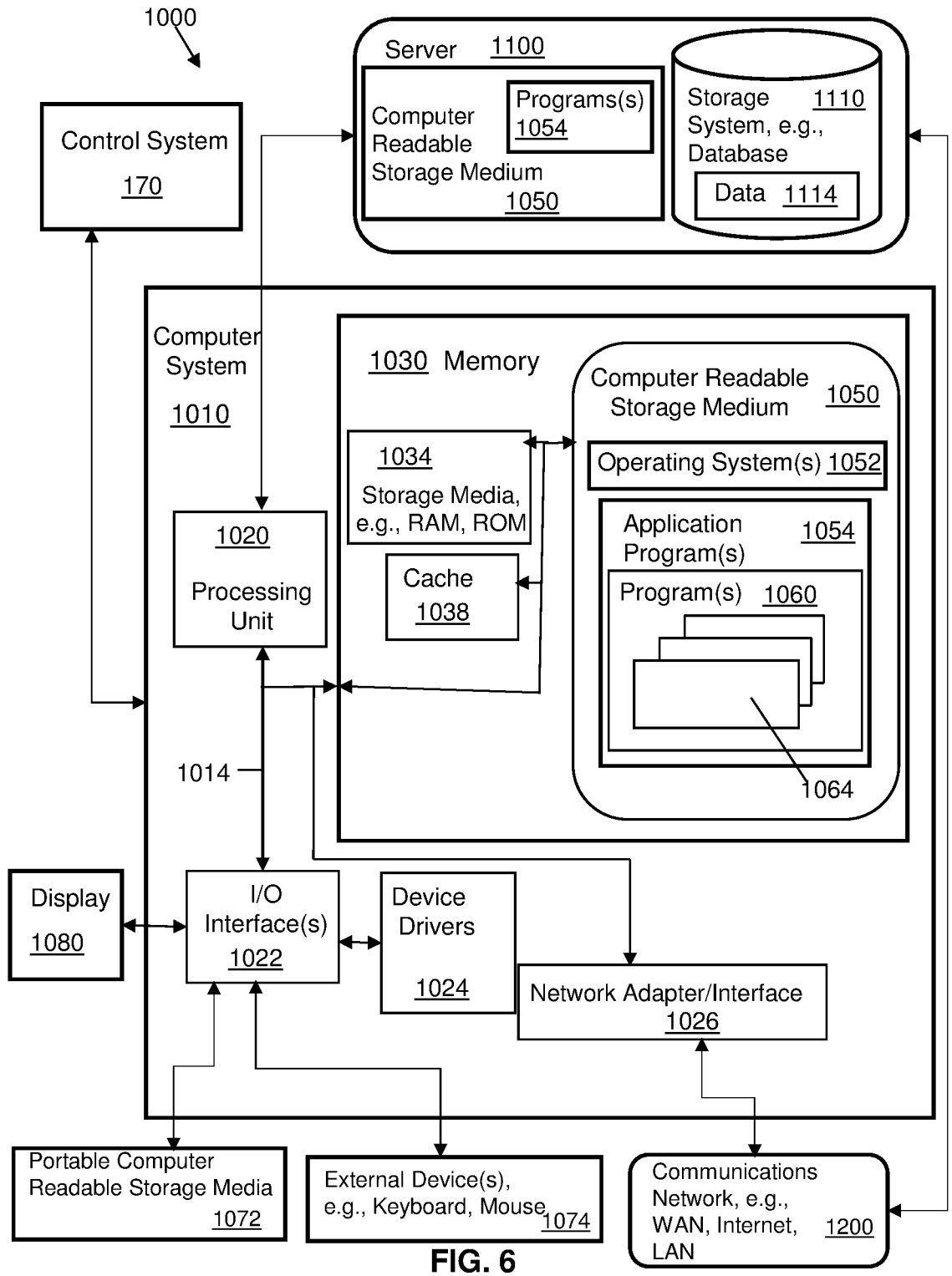
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

Referring to FIGS. 5 and 6, in one embodiment according to the present disclosure, a system 500 can be used for dynamic pairing of devices at a new location based on historical context with respect to previous device pairing and a pairing environment by using networked computer system resources.

Embodiments of the present disclosure include methods and systems for addressing when a group of people change their working location, and their devices connect to devices at a new location using auto-paring to appropriate static devices in the new working location based on the context of their activities in the previous work location. Thereby, the people/users can continue to perform the activities without any need of manual configuration of the devices in the new location.

The methods and systems of the present disclosure can include using historical learning, such that each device can recognize itself based on how the individual devices are participating in different types of workflows. Accordingly when any sets of devices are moved to a new location from the current work location, then the candidate devices can be auto-paired with the devices in the new location having a similar role of the historical device to ensure the continuity of the workflow without any need of manual configuring, pairing, etc. If any individual or a group of people are moving from one location to another location and performing activities using their devices, then the system can auto-pair with candidate devices in the new environment so that continuity of the activities can be maintained in the new location/environment. The devices can be identified with the types of activity the user or a group of users are performing, and accordingly based on the identified types of activities, and workflow sequence, the pairing of the devices can be changed dynamically so that appropriate devices will be paired in the new location. In this manner, the same device can be used for performing different types of activities, and based on the types of activities being performed with the devices, appropriate devices required to continue the workflow can be auto-paired, so that no additional configuration is required.

In one example, in a multi-device ecosystem, each device will be recognizing each other by the involvement of the devices in the workflow, and the context of the activities. If the contextual scenario is changed, e.g., the location, or device environment, then the appropriate devices will auto-pair in the current location, which can be a new location. While performing auto-pairing in the same location or in new-location, the system will identify the relative locations of the devices in the surrounding environment, changes in the activities in the devices and accordingly the device pairing can be refreshed to ensure the candidate device of the activities are paired. The system while trying to auto-pair with a target device can also check the hardware, software, firmware, communication protocol compatibility between two or more devices, and thereby auto recommend the source and target device administrators (which can be identified by a system itself based on historical access, troubleshooting outcome etc.,) for the context, ensuring safe and secure transfer of data while auto pairing. The system will also notify the user of any failed auto pairing for one or more devices, and can display the reasons for the failure connectivity by context. For example, reasons for failure can include, a lack of an IoT (Internet of Things) sensor feed, historical corpus, no Storage space, improper network/protocol or other internal or external factors. The system, based on an identified reason for failure connectivity, can recommend the enhancements to hardware/software/firmware upgrades/patches to manufacturing companies or admin users derived from to ensure the auto pairing is seamless for future connectivity.

Referring to FIGS. 5A and 5B, in an embodiment according to the present disclosure, an office workplace is represented a first location 510 and the team 522 is moving from one location to another location, e.g., the first location 510 to the second location 550. The team 522 includes users/people 525 represented in FIG. 5A as two users but it is understood that a team could have one or more users. Each user could have one or more devices which are used by each of the users as their own device(s) and/or as team devices. The devices are collectively represented as team devices 530 in FIG. 5A. based on the change in the location, various static computing system will be disconnected, so the proposed system will be auto-paring the devices in the new location. In one example, a mobile phone can automatically alter for a current location by automatically adding an extension for a phone number associated with a country location. In another example, an office setup in a new location can include printers, Wi-Fi routers, etc., and a system can be set up with static settings that are available on a cloud device and can be synced with other locations. The new location is represented as the second location 550 which includes IoT enabled devise 554 and statis devices 556. Devices in the first and second locations can connect to a cloud environment 540, for example, the team devices 530 can connect to a cloud environment 540. For example, a cloud environment can include computer system resources, including data storage, i.e., cloud storage.

In other embodiments and examples, in an IoT (Internet of Things) ecosystem each IoT enabled device 514 can be identified uniquely using a method and system, and the system can also identify devices which are paired. The system can identify how the devices are communicating with each other to perform any activity. Each device can share information while performing the activities, and accordingly the system communicating with each of the devices can identify what activities are performed by the devices. The system can identify which information is shared among the devices while performing the activities. The system can analyze a multi-device ecosystem and the received information generated by each device and can identifying what activities are performed. The system can analyze the multi-device ecosystem and recognize each activity individually, and can also identify what the steps are for each activity. The system can identify how different devices are participating in the activities, for example, what data is generated, how the generated data is used, what activity and decision is taken from that gathered data, etc.

The system can identify from a historical corpus, activities performed, steps performed, device data generation, how generated data is used in an activity, device specifications, etc., and accordingly machine learning can be performed on the gathered data to identify how different devices are involved in the activities, and the roles of various devices etc. Based on the historical learning, the system can recognize how different devices participate in a workflow and the role of the devices. The devices can be identified based on specifications, so specifications and role of the devices in the workflow can be considered to recognize the devices individually. The system can also recognize the devices based on the activities, in one case, the system can identify which devices are required to perform an activity. Based on a specification, the system can identify which devices are static and which devices are mobile.

If one or more users move from one location to another location, then based on the change in location/position of the devices, the static devices 518 will not be able to connect without the present system. Using the present system the static devices 518 will be able to connect, so there will not be a break in the workflow. Based on the change to the new location, the identified devices and the system can identify which roles are missing in the new location. The system can identify devices which can perform the required roles in the new location. Based on the network, search appropriate devices can be identified in the new location which can perform the expected role. The newly identified devices can be auto paired, or a user can be notified which device in the new location can perform the activity. The participating devices can be auto paired in the new location and can participate in the workflow.

More Examples and Embodiments

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 6 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model dynamic pairing of devices at a new location based on historical context with respect to previous device pairing and a pairing environment.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machines or devices in one or more technology ecosystems.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
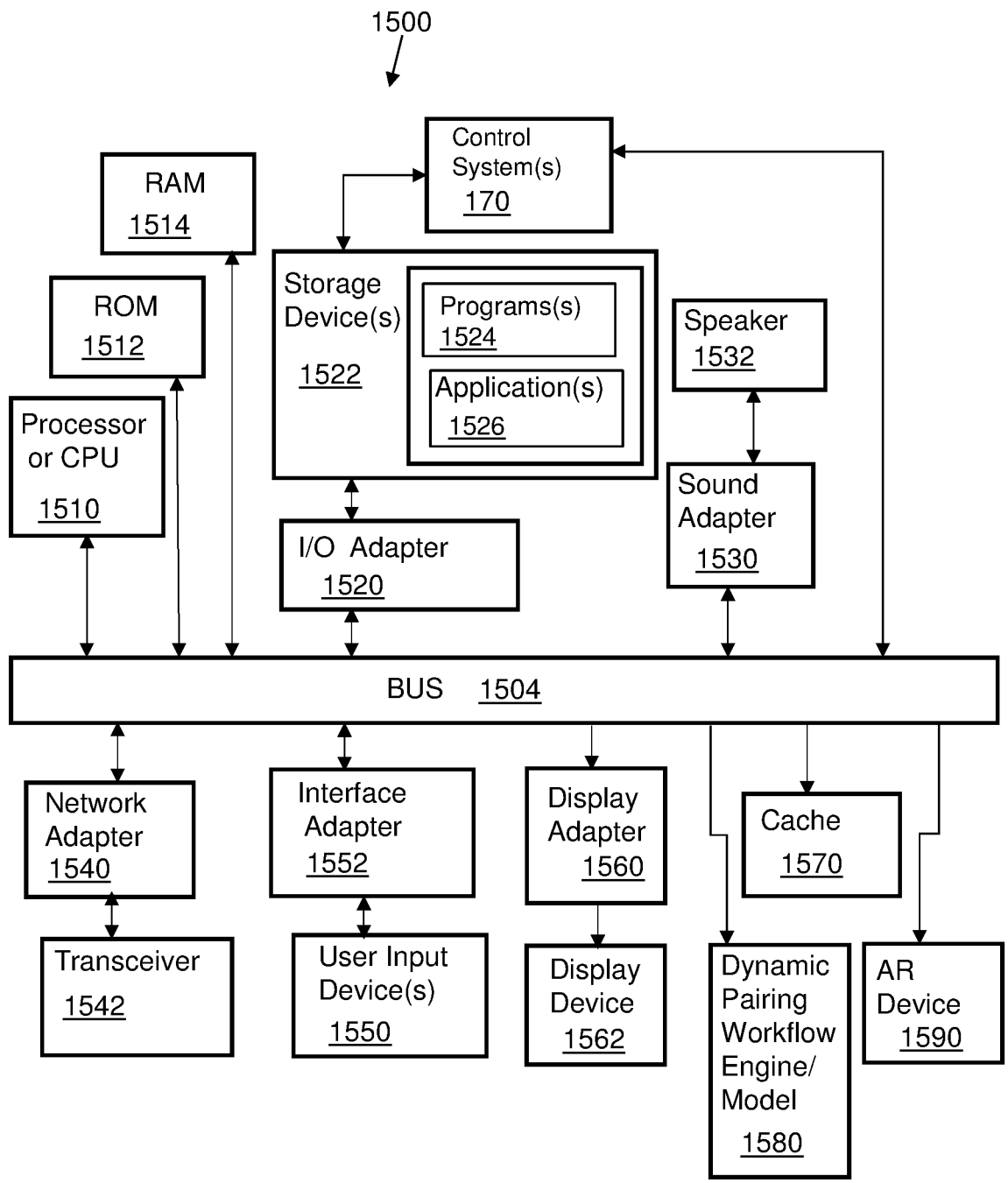
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1590 can also be operatively coupled to the bus 1504. A dynamic pairing workflow engine/model 1580 can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
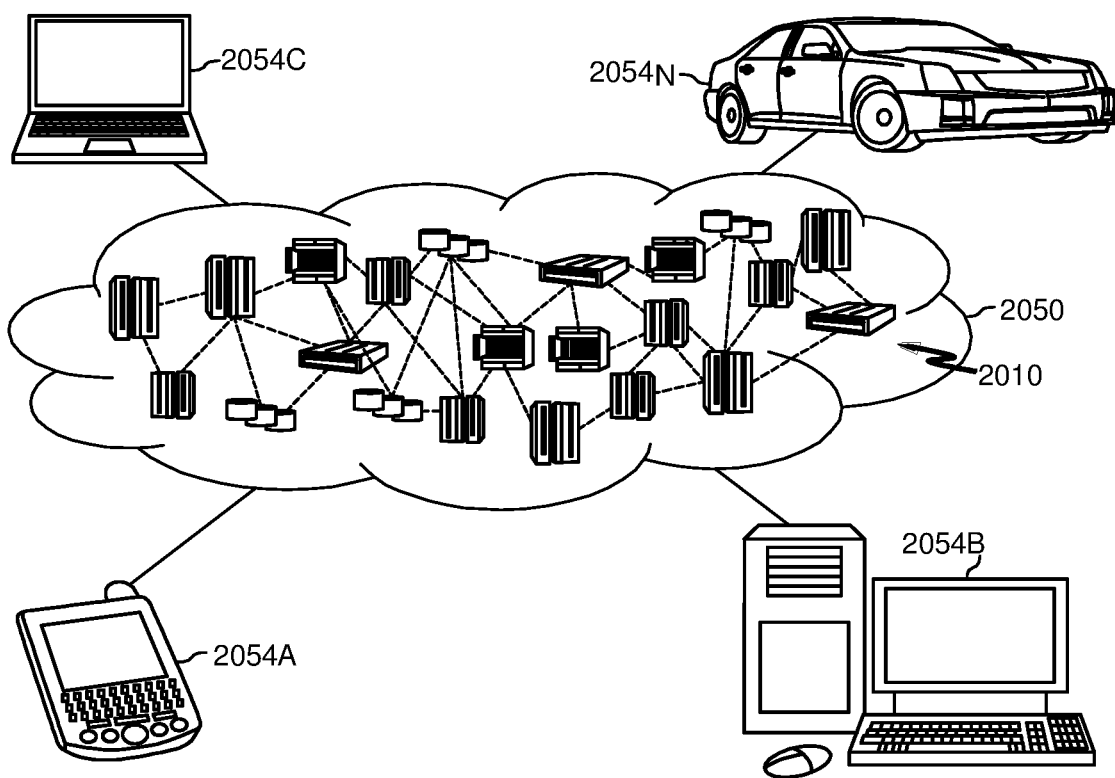
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
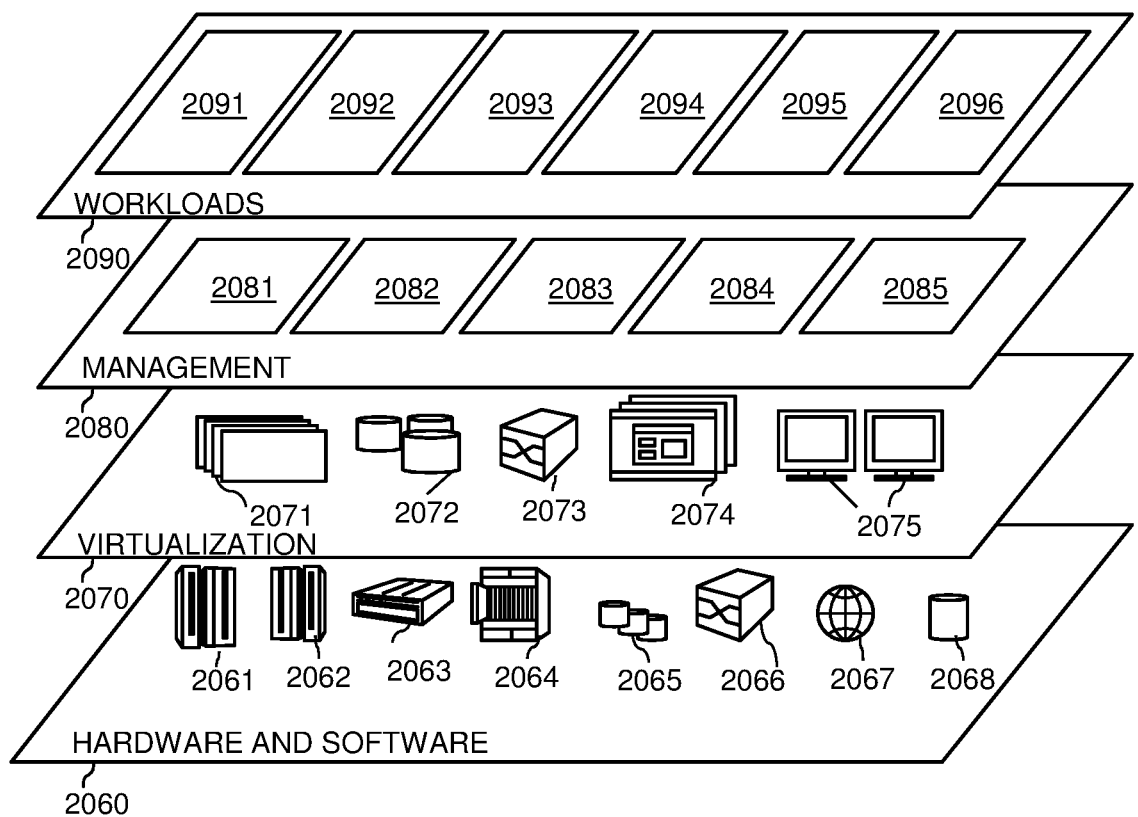
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized.

Examples of workloads and functions which may be provided from this layer include: mapping and navigation 2091; software development and lifecycle management 2092; virtual classroom education delivery 2093; data analytics processing 2094; transaction processing 2095; and implementing dynamic pairing of device 2096, for example, dynamic pairing of devices at a new location using a pairing workflow and/or computer modeling.

What is claimed is:

1. A computer-implemented method for dynamic pairing of devices at a new location based on historical context with respect to previous device pairing and a pairing environment, comprising:
   receiving, at a computer, a request to pair a user device to a device at a new location;
   analyzing, using the computer, historical context of the user device paired at a previous location to one or more devices at the previous location;
   automatically initiating pairing of the user device to the device at the new location based on the analysis of the historical context, the automatic initiation including adjusting settings on the user device based on the historical context;
   automatically pairing the user device to the device at the new location;
   determining a workflow function for a device at the previous location paired with the user device at the previous location, and determining a workflow function for the device at the new location;
   comparing settings in the user device for the previous location to available settings for the user device at the new location, to pair the user device with the device in the new location; and
   determining a new setting in the user device for the new location, based on the workflow function for the device paired with the user device at the previous location and the compared settings.

2. The method of claim 1, further comprising:
   comparing settings in the user device for the previous location to available settings in the device at the new location, to pair with the device in the new location.

3. The method of claim 1, further comprising:
   determining a workflow function for a device at the previous location paired with the user device at the previous location, and determining a workflow function for a device at the new location, and identifying a type of activity for the device at the new location;
   comparing settings in the user device for the previous location to available settings in the user device for pairing to the device at the new location, and comparing setting of the device at the previous location to the setting of the device at the new location for pairing the user device with the device in the new location; and
   determining new settings in the user device for the new location, based on the comparing of the settings in the user device for the previous location and the available settings in the user device, and further comparing the available settings in the device in the new location, to pair the user device to the device in the new location, and the determining of the new settings being based on the workflow function and the type of activity for the device at both the previous location and the new location.

4. The method of claim 1, further comprising:
   sending a notification to the user device communicating a failure to pair with the device at the new location.

5. The method of claim 1, further comprising:
   sending a notification to the user device communicating a failure to pair with the device at the new location; and
   sending a recommendation to the user device for pairing with the device at the new location in response to the failure to pair.

6. The method of claim 1, further comprising:
   generating a model, at least in part, incorporating the analyzing of the historical context and the automatically initiating of the pairing;
   updating the historical context;
   updating the analysis of the historical context; and
   re-initiating the automatic pairing of the user device to the device at the new location.

7. The method of claim 1, further comprising:
   receiving, at the computer, a request to pair the user device to a plurality of device at the new location;
   analyzing, using the computer, historical context of the user device paired at previous locations to one or more devices at each of the previous locations;
   automatically initiating pairing of the user device to one or more of the plurality of devices at the new location based on the analysis of the historical context, the automatic initiation including adjusting settings on the user device based on the historical context; and
   automatically pairing the user device to the one or more of the plurality of devices at the new location.

8. The method of claim 1, further comprising:
   The user device communicating with a cloud based account using a communications network.

9. The method of claim 1, wherein the historical context is included in historical data stored in a knowledge corpus database.

10. A system using a computer for dynamic pairing of devices at a new location based on historical context with respect to previous device pairing and a pairing environment, which comprises:
    a computer system comprising; a computer processor, a computer-readable storage medium, and program instructions stored on the computer-readable storage medium being executable by the processor, to cause the computer system to perform the following functions to;
    receive, at a computer, a request to pair a user device to a device at a new location;
    analyze, using the computer, historical context of the user device paired at a previous location to one or more devices at the previous location;
    automatically initiate pairing of the user device to the device at the new location based on the analysis of the historical context, the automatic initiation including adjusting settings on the user device based on the historical context;
    automatically pair the user device to the device at the new location;
    determine a workflow function for a device at the previous location paired with the user device at the previous location, and determining a workflow function for the device at the new location;
    compare settings in the user device for the previous location to available settings for the user device at the new location, to pair the user device with the device in the new location; and
    determine a new setting in the user device for the new location, based on the workflow function for the device paired with the user device at the previous location and the compared settings.

11. The system of claim 10, further comprising:
comparing settings in the user device for the previous location to available settings in the device at the new location, to pair with the device in the new location.

12. The system of claim 10, further comprising:
determining a workflow function for a device at the previous location paired with the user device at the previous location, and determining a workflow function for a device at the new location, and identifying a type of activity for the device at the new location;
comparing settings in the user device for the previous location to available settings in the user device for pairing to the device at the new location, and comparing setting of the device at the previous location to the setting of the device at the new location for pairing the user device with the device in the new location; and
determining new settings in the user device for the new location, based on the comparing of the settings in the user device for the previous location and the available settings in the user device, and the available settings in the device in the new location, to pair the user device to the device in the new location, and the determining of the new settings being based on the workflow function and the type of activity for the device at both the previous location and the new location.

13. The system of claim 10, further comprising:
sending a notification to the user device communicating a failure to pair with the device at the new location.

14. The system of claim 10, further comprising:
sending a notification to the user device communicating a failure to pair with the device at the new location; and
sending a recommendation to the user device for pairing with the device at the new location in response to the failure to pair.

15. The system of claim 10, further comprising:
generating a model, at least in part, incorporating the analyzing of the historical context and the automatically initiating of the pairing;
updating the historical context;
updating the analysis of the historical context; and
re-initiating the automatic pairing of the user device to the device at the new location.

16. The system of claim 10, further comprising:
receiving, at the computer, a request to pair the user device to a plurality of device at the new location;
analyzing, using the computer, historical context of the user device paired at previous locations to one or more devices at each of the previous locations;
automatically initiating pairing of the user device to one or more of the plurality of devices at the new location based on the analysis of the historical context, the automatic initiation including adjusting settings on the user device based on the historical context; and
automatically pairing the user device to the one or more of the plurality of devices at the new location.

17. The system of claim 10, further comprising:
The user device communicating with a cloud based account using a communications network.

18. A computer program product for dynamic pairing of devices at a new location based on historical context with respect to previous device pairing and a pairing environment, the computer program product comprising a computer readable storage medium having program instructions embodied therewith, the program instructions executable by a computer to cause the computer to perform functions, by the computer, comprising the functions to:

receive, at a computer, a request to pair a user device to a device at a new location;
analyze, using the computer, historical context of the user device paired at a previous location to one or more devices at the previous location;
automatically initiate pairing of the user device to the device at the new location based on the analysis of the historical context, the automatic initiation including adjusting settings on the user device based on the historical context;
automatically pair the user device to the device at the new location;
determine a workflow function for a device at the previous location paired with the user device at the previous location, and determining a workflow function for the device at the new location;
compare settings in the user device for the previous location to available settings for the user device at the new location, to pair the user device with the device in the new location; and
determine a new setting in the user device for the new location, based on the workflow function for the device paired with the user device at the previous location and the compared settings.

19. A computer-implemented method for dynamic pairing of devices at a new location based on historical context with respect to previous device pairing and a pairing environment, comprising:
receiving, at a computer, a request to pair a user device to a device at a new location;
analyzing, using the computer, historical context of the user device paired at a previous location to one or more devices at the previous location;
automatically initiating pairing of the user device to the device at the new location based on the analysis of the historical context, the automatic initiation including adjusting settings on the user device based on the historical context;
automatically pairing the user device to the device at the new location;
determining a workflow function for a device at the previous location paired with the user device at the previous location, and determining a workflow function for a device at the new location, and identifying a type of activity for the device at the new location;
comparing settings in the user device for the previous location to available settings in the user device for pairing to the device at the new location, and comparing setting of the device at the previous location to the setting of the device at the new location for pairing the user device with the device in the new location; and
determining new settings in the user device for the new location, based on the comparing of the settings in the user device for the previous location and the available settings in the user device, and further comparing the available settings in the device in the new location, to pair the user device to the device in the new location, and the determining of the new settings being based on the workflow function and the type of activity for the device at both the previous location and the new location.

20. A system using a computer for dynamic pairing of devices at a new location based on historical context with respect to previous device pairing and a pairing environment, which comprises:
a computer system comprising; a computer processor, a computer-readable storage medium, and program instructions stored on the computer-readable storage medium being executable by the processor, to cause the computer system to perform the following functions to;

receive, at a computer, a request to pair a user device to a device at a new location;

analyze, using the computer, historical context of the user device paired at a previous location to one or more devices at the previous location;

automatically initiate pairing of the user device to the device at the new location based on the analysis of the historical context, the automatic initiation including adjusting settings on the user device based on the historical context;

automatically pair the user device to the device at the new location;

determine a workflow function for a device at the previous location paired with the user device at the previous location, and determining a workflow function for a device at the new location, and identifying a type of activity for the device at the new location;

compare settings in the user device for the previous location to available settings in the user device for pairing to the device at the new location, and comparing setting of the device at the previous location to the setting of the device at the new location for pairing the user device with the device in the new location; and determine new settings in the user device for the new location, based on the comparing of the settings in the user device for the previous location and the available settings in the user device, and the available settings in the device in the new location, to pair the user device to the device in the new location, and the determining of the new settings being based on the workflow function and the type of activity for the device at both the previous location and the new location.

\* \* \* \* \*